United States Patent [19]

Brown

[11] Patent Number: 4,762,374
[45] Date of Patent: Aug. 9, 1988

[54] WHEEL COVER ASSEMBLY

[75] Inventor: Trevor J. Brown, Rochester, Mich.

[73] Assignee: General Motors Corporation, Detroit, Mich.

[21] Appl. No.: 26,043

[22] Filed: Mar. 16, 1987

[51] Int. Cl.⁴ .............................................. B60B 7/00
[52] U.S. Cl. ................ 301/37 P; 301/37 R; 301/108 R
[58] Field of Search ............ 301/37 R, 37 P, 37 CD, 301/108 A, 108 R

[56] References Cited

U.S. PATENT DOCUMENTS

| 1,836,424 | 12/1931 | Yanss | 301/108 R |
| 1,953,634 | 4/1934 | Reichenbach | 301/108 R |
| 1,960,556 | 5/1934 | Snyder | 301/108 R |
| 2,689,770 | 9/1954 | Pipes . | |
| 2,746,805 | 5/1956 | Gamundi . | |
| 3,480,329 | 11/1969 | Foster et al. . | |
| 3,671,076 | 6/1972 | Aske, Jr. . | |
| 3,747,984 | 7/1973 | Andrews et al. . | |
| 3,883,181 | 5/1975 | Dissinger . | |
| 4,027,919 | 6/1977 | Foster et al. . | |
| 4,266,831 | 5/1981 | Foster et al. | 301/37 PB |
| 4,352,525 | 10/1982 | Foster et al. . | |
| 4,357,053 | 11/1982 | Spisak . | |
| 4,366,992 | 1/1983 | Enke . | |
| 4,457,559 | 7/1984 | Renz . | |
| 4,458,952 | 7/1984 | Foster et al. . | |
| 4,470,639 | 9/1984 | Loper . | |
| 4,529,251 | 7/1985 | Schobbe . | |
| 4,645,269 | 2/1987 | Brown et al. | 301/37 CD |

FOREIGN PATENT DOCUMENTS

| 79703 | 6/1980 | Japan | 301/37 R |
| 39501 | 3/1983 | Japan | 301/37 R |

Primary Examiner—James B. Marbert
Attorney, Agent, or Firm—Herbert Furman

[57] ABSTRACT

A vehicle wheel cover assembly includes a lightweight molded plastic cover member having a series of axial inwardly extending flanges which are apertured. The wire ring assembly includes cantilevered loops having bight portions which extend outwardly through the openings of the flanges to retain the wire ring assembly to the wheel. Additional bight portions of the loops engage the flanges of the cover member to clamp these flanges to the wheel.

9 Claims, 1 Drawing Sheet

U.S. Patent | Aug. 9, 1988 | 4,762,374
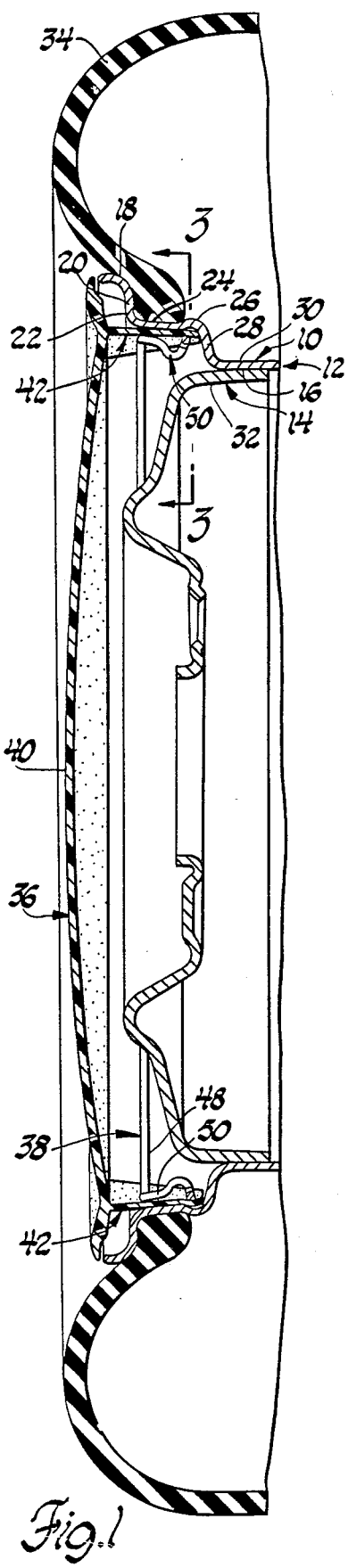

WHEEL COVER ASSEMBLY

This invention relates generally to vehicle wheel cover assemblies and more particularly to a wheel cover assembly having improved wire ring retaining means.

It is known to provide vehicle wheel cover assemblies which include a plastic cover and a wire hoop or ring having radial projections which extend radially outwardly through openings in a flange or in axial projections of the cover and into endwise engagement with the wheel to retain the cover to the wheel. U.S. Pat. Nos. 4,027,919, Foster et al, issued June 7, 1977, and 4,266,831, Foster et al issued May 12, 1981, are representative of wheel covers of this type.

In such covers, the wire rings are directly loaded whenever the cover is mounted to and dismounted from the wheel. Therefore, such rings must collapse radially during installation and removal of the cover. This requires a ring having a high spring rate.

The wheel cover assembly of this invention includes a lightweight molded plastic cover and a wire ring for retaining the cover to the wheel. The wire ring includes a plurality of retention loops which are cantilevered from the wire ring in an axially inward direction. Each loop includes a pair of axially inwardly extending legs which are interconnected by a circumferentially extending bridge leg. The bridge leg includes a pair of wheel engaging bight portions and an intermediate cover engaging bight portion. The wheel engaging bight portions extend radially outwardly through slots in respective flanges of the cover for engagement with the wheel to retain the wire ring to the wheel. The cover engaging bight portion engages the inner side of the flange of the cover to hold this flange against the wheel and thereby retain the cover to the wheel. There is no engagement of the wire ring with the cover other than through the cover engaging bight portions. Thus, the cover is not loaded by the wire ring and the spring rate of the wire ring can be greatly reduced to permit easy installation and removal of the cover while still providing adequate retention of the cover to the wheel during operation of the vehicle.

The primary feature of this invention is that it provides an improved wheel cover assembly which includes a lightweight wheel cover of molded plastic material which is retained to the wheel by cantilevered loops of a wire ring. Another feature is that the cantilevered loops of the wire ring self-retain the wire ring to the wheel and additionally clamp flanges of the cover to the wheel independently of the mounting of the ring to the wheel. A further feature is that the cantilevered loops of the wire ring rotate slightly relative to the ring during installation and removal of the cover assembly but do not load any portion of the cover other than the flanges thereof.

These and other features will be readily apparent from the following specification and drawings wherein:

FIG. 1 is a sectional view of a vehicle wheel having a wheel cover assembly according to this invention mounted thereon.

FIG. 2 is an enlarged view of a portion of FIG. 1.

FIG. 3 is an enlarged view taken along line 3—3 of FIG. 1.

FIG. 4 is a view taken along line 4—4 of FIG. 3, and

FIG. 5 is a perspective view of a portion of the wire ring and one of the loops.

Referring now particularly to FIG. 1 of the drawings, a vehicle wheel designated generally 10 includes a rim portion 12 and a disc portion 14 which are welded or riveted together at 16. The rim portion 12 includes an axially outwardly located lip flange 18 which is joined to a radially inwardly extending flange 20. Flange 20 merges on an arcuate juncture 22 into an axially inwardly extending tapered flange 24. A tire bead 26 which opens radially inwardly, connects flange 24 with an axially outwardly facing radial extending flange 28 which merges into a drop center rim flange 30 joined at 16 to the outer flange 32 of disc 14. A conventional tire 34 seats on the flanges 20 and 24 and is retained by the bead 26 when inflated. The foregoing structure is conventional and forms no part of this invention.

A wheel cover assembly according to this invention includes a cover assembly 36 of lightweight molded plastic material and a wire ring assembly 38. The cover assembly 36 includes an outer circular cover member 40 which fits within the opening of the wheel defined by flange 18. Cover member 40 includes a number, such as 4, of axially inwardly extending retention flanges 42. As best shown in FIGS. 2 and 4, the flanges 42 follow the general curvature of the flange 24 and bead 26 and are tapered axially inwardly of the cover 40. Each flange 42 includes a circumferentially extending inner edge portion 44 of thickened cross-section which is provided with a pair of circumferentially spaced slots 46 extending therethrough.

The wire ring assembly 38 includes a wire ring 48 having a plurality of integral axially inwardly extending retention loops 50, equal in number to the number of flanges 42 and cantilevered from the wire ring 48. As best shown in FIGS. 2 and 5, the radially inner and outer sides 52 of the ring 48 are flattened in comparison with the circular axial inner and outer sides of the ring. Each loop 50 includes axially inwardly extending legs 54 which are cantilevered from the wire ring as shown in FIG. 2 and include a linear portion 56 and an arcuate portion 58. The radial inner and outer sides of legs 54 are flattened in the same manner as the radially inner and outer sides 52 of the ring 48. The axially inner ends of the legs 54 are interconnected by a bridge leg 60 having a pair of wheel engaging bights 62 connected by an intermediate cover engaging bight 64. As best shown in FIGS. 2 and 5, the axial inner and outer sides of leg 60 are flattened. The radial outer surfaces of the bights 62 are serrated at 66.

When the wire ring assembly 38 is assembled to the cover, the wire ring 48 is located in radial inward spaced relationship to the flanges 42 as shown in FIG. 2. The loops 50 extend axially inwardly in cantilevered fashion with respect to flanges 42 and wire ring 48. The bights 66 of each loop extend radially outwardly through respective slots 46 of a respective flange 42. The circumferential extent of slots 46 is less than that of bights 62. The bight 64 is of lesser radial extent than bights 62 and seats against the radially inner side 70 of the thickened axial inner edge 44 of the flange 42.

When the cover assembly is mounted on the wheel, the valve stem opening of the cover member 40, not shown, is aligned with the valve stem which extends outwardly of the rim portion 12 and then the cover assembly is moved axially inwardly of the wheel. During this movement, the engagement of the serrated portions 66 of bights 62 with flange 24 slightly twists or rotates each of the loops 50 relative to the wire ring 48 until the bights 62 move into engagement with the tire bead 26. The serrations 66 of bights 62 bite into the painted surface of the tire bead 26 to provide additional retention strength for retaining the wheel cover assembly to the wheel. The cooperation of bights 62 and the closed ends of slots 46 limits rotation of the cover member 40 relative to the wire ring assembly 38. The bights 64 hold or clamp the thickened inner edge portions 44 of the flanges 42 against the axial inner and outer legs of the tire bead 26, as shown in FIG. 2. If desired, bights 64 can be serrated in the same manner as bights 62.

From the foregoing description, it can be seen that the wire ring 48 does not collapse radially inwardly when the cover assembly is installed or removed relative to the wheel. The cantilevered loops 50 rotate or twist through a relatively small radial angle during such installation or removal. Thus, the spring rate of the wire ring assembly 38 can be reduced to provide relatively consistent retention loads. The loops 50 are always located angular to the plane of the wire ring 48, with this angular relationship increasing upon installation of the cover assembly to the wheel. This angular relationship upon installation provides a wedging action that increases the loads required for removal.

Since the wire ring 48 does not engage or load the cover member 40, the cover member can be made of lightweight molded plastic material. The bights 64 extend radially outwardly less than the bights 62 by a distance generally equal to the thickness of the inner edge portion 44 of the flanges 42. Thus, the flanges 42 and their inner edge portions are not excessively loaded by the loops 50. Additionally, the flattened side of the bights 62 provides an increased surface area engagement with the bead 26. The flattened side of the bights 64 likewise provide a flattened area of engagement with the radially inner sides of the edge portions 44 to increase durability by reducing line loading of such edge portions.

Thus this invention provides an improved vehicle wheel cover assembly.

I claim:

1. A wheel cover assembly for mounting to an axially extending radially facing flange of a vehicle wheel, comprising, in combination,
   a wheel cover having an axially inwardly extending cover retention flange provided with an opening therethrough,
   a wire ring located radially inwardly of the cover retention flange and including an axially inwardly extending retention loop cantilevered from the wire ring and radially rotatable relative thereto,
   the loop including a pair of axially inwardly extending legs having their axially inner ends joined by a radially outwardly extending bridge leg, the bridge leg including a wheel engaging portion and a cover flange engaging portion,
   the wheel engaging portion of the bridge leg of the loop extending radially outwardly through the cover flange opening and being engageable with the flange of the wheel to mount the wire ring to the wheel,
   the cover flange engaging portion of the bridge leg of the loop engaging the radially inner side of the cover flange to hold the cover flange against the wheel flange and mount the cover to the wheel independently of any engagement of the wire ring with the cover.

2. A wheel cover assembly for mounting to an axially extending radially facing flange of a vehicle wheel, comprising, in combination,
   a wheel cover provided with a number of axially inwardly extending cover retention flanges, each flange having an opening therethrough,
   a wire ring located to the radially inward side of the cover retention flanges and including a number of axially inwardly extending retention loops cantilevered from the wire ring, each retention loop being radially rotatable relative to the wire ring and respective to one of the retention flanges,
   each loop including a pair of axially inwardly extending legs having their axially inner ends joined by a bridge leg, the bridge leg including a radially outwardly extending wheel engaging bight portion and a radially outwardly extending cover flange engaging bight portion,
   the wheel engaging bight portion of each bridge leg of the loop extending radially outwardly through the opening of a respective retention flange for engagement with the flange of the wheel to mount the wire ring to the wheel,
   the cover flange engaging bight portion of each bridge leg of the loop engaging the radially inner side of a respective cover flange to hold the cover flange against the flange of the wheel and mount the cover to the wheel independently of any engagement of the wire ring with the cover.

3. A wheel cover assembly for mounting to an axially extending radially facing flange of a vehicle wheel, comprising, in combination,
   a cover provided with a number of circumferentially spaced axially inwardly extending cover retention flanges, each cover flange having a circumferentially spaced pair of slots therethrough,
   a wire ring located radially inwardly of the cover flanges and including a number of axially inwardly extending retention loops cantilevered from the wire ring, each retention loop being independently rotatable relative to the wire ring and respective to one of the cover flanges,
   each loop including a pair of axially inwardly extending legs having their axially inner ends joined by a bridge leg including a pair of radially outwardly extending wheel engaging portions and a cover flange engaging portion,
   the pair of wheel engaging portions of each bridge leg of each loop extending radially outwardly through a respective one of the pair of slots of a respective cover flange for engagement with the flange of the wheel to mount the wire ring to the wheel,
   the cover flange engaging portion of each bridge leg of each loop engaging the radially inner side of a respective cover flange to hold the cover flange against the flange of the wheel and mount the cover to the wheel independently of any engagement of the wire ring with the cover.

4. The combination recited in claim 1 wherein the retention loop is located angularly relative to the axis of the cover and rotates radially inwardly relative to the plane of the wire ring when the cover is installed to the wheel.

5. The combination recited in claim 1 wherein the bridge leg includes a pair of wheel engaging portions and the cover flange engaging portion is located between such wheel engaging flange portions.

6. The combination recited in claim 5 wherein the wheel engaging portions are serrated for increased biting into the wheel flange.

7. The combination recited in claim 1 wherein the bridge leg is formed of circular wire and has its wheel engaging and cover engaging radially outer side flattened.

8. The combination recited in claim 1 wherein the bridge leg includes a spaced pair of bights providing a spaced pair of wheel engaging portions and a bight intermediate the spaced pair of bights providing the cover engaging portion.

9. The combination recited in claim 1 wherein the loop includes arcuate junctures joining the axially inwardly extending legs to the bridge leg.

* * * * *